UNITED STATES PATENT OFFICE.

ROBERT MAY CAFFALL AND DANIEL MILLER, OF ALTON, ENGLAND, ASSIGNORS TO WILLIAM GOWERS MONK, OF BROOKLYN, NEW YORK.

IMPROVEMENT IN COMPOSITIONS FOR WATER-PROOFING WALLS.

Specification forming part of Letters Patent No. 119,964, dated October 17, 1871; antedated September 25, 1871.

*To all whom it may concern:*

Be it known that we, ROBERT MAY CAFFALL and DANIEL MILLER, of Alton, in the county of Hants, England, have invented or discovered an Improved Liquid Composition for rendering walls and exposed surfaces impenetrable to moisture; and we do hereby declare that the said invention or discovery is fully described and ascertained in and by the following statement thereof—that is to say:

This invention relates to the combination of certain solid ingredients which will dissolve in spirits and become amalgamated to produce a liquid composition or enamel paint for coating brick or stone walls, stucco fronts or facings, and other exposed surfaces to render them impervious to moisture.

The composition is composed of gum shellac, gum benzoine, linseed-oil, and spirit. These are treated in a special manner and in such proportions as to make them available for the particular surface or material the composition is intended to coat or paint.

As an example, we give the following proportions of the ingredients in the above composition, which we have found to answer for brick and stone walls, whereby they are rendered impenetrable to moisture, and which is not blistered or discolored by the heat of the sun or affected by exposure to rain or frost. We first dissolve thirty pounds of gum shellac in nine gallons of spirits in one vessel, and thirty-six pounds of gum benzoine in six gallons of spirits in another vessel. We then mix one gill of the benzoine liquid to one gallon of the shellac liquor, adding one and a half pint of linseed-oil thereto. The mixture is then stirred to thoroughly incorporate the oil with the spirit, and it is ready for use.

The above liquid composition is colorless or nearly so, and does not destroy the natural colors or tint of the material on which it is placed.

The composition can be applied by a painter's brush, and in a similar manner to ordinary paint-work. It becomes dry after a short time from exposure when spread in thin layers, and prevents the damp penetrating through the outer surface of the material on which it is laid.

There is no limit to the purposes to which the composition can be applied, whether for in-doors or for outside work. It can be made to assume any tint or color by the addition of pigments or dye-stuffs, and will be found of great value in all cases where walls are much exposed to the action of moisture, such as in wet fogs and heavy dews, particularly in low-lying districts, where damp rises from the soil.

The foregoing proportions are given as an example, in order to enable our invention to be understood; but we do not confine ourselves to them exactly, nor to the precise manner of preparing the composition, because the different materials to be coated or enameled will be more or less porous, and the composition would be more or less fluid in proportion.

What we desire to claim, therefore, is—

The enameling composition or paint composed of the ingredients known as gum shellac, gum benzoine, linseed-oil, and spirit, prepared in the manner before mentioned, for the covering or coating of walls and other exposed surfaces to render them impenetrable to moisture, as hereinbefore described and set forth.

In witness whereof we, the said ROBERT MAY CAFFALL and DANIEL MILLER, have hereunto set our hands this twenty-ninth day of October, one thousand eight hundred and seventy.

ROBERT MAY CAFFALL.
    DANIEL MILLER.

Witnesses:
 SAMUEL ERNEST CAFFALL, *Alton.*
 WILLIAM BAKER, *Alton.*  (35)